United States Patent
Bunton et al.

(10) Patent No.: US 6,870,814 B1
(45) Date of Patent: Mar. 22, 2005

(54) LINK EXTENDERS WITH ERROR PROPAGATION AND REPORTING

(75) Inventors: William P. Bunton, Pflugerville, TX (US); David J. Garcia, Los Gatos, CA (US); John C. Krause, Georgetown, TX (US); William J. Watson, Austin, TX (US); David A. Brown, Austin, TX (US); Richard W. Cutts, Jr., Georgetown, TX (US); Melvin Kent Benedict, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/415,731

(22) Filed: Oct. 12, 1999

(51) Int. Cl.[7] .................................................. H04L 12/26
(52) U.S. Cl. ...................................... 370/245; 370/217
(58) Field of Search ................................ 370/242, 243, 370/244, 245, 248, 252, 225, 217

(56) References Cited

U.S. PATENT DOCUMENTS

| | | | |
|---|---|---|---|
| 5,208,810 A | 5/1993 | Park | 370/94.1 |
| 5,268,900 A | 12/1993 | Hluchyj et al. | 370/94.1 |
| 5,357,563 A | 10/1994 | Hamilton et al. | |
| 5,557,751 A | 9/1996 | Banman et al. | 395/250 |
| 5,574,849 A | 11/1996 | Sonnier et al. | 395/182.1 |
| 5,675,579 A * | 10/1997 | Watson et al. | 370/248 |
| 5,682,142 A | 10/1997 | Loosmore et al. | |
| 5,694,121 A | 12/1997 | Krause et al. | 340/825.5 |
| 5,710,549 A | 1/1998 | Horst et al. | 340/825.5 |
| 5,867,501 A | 2/1999 | Horst et al. | 370/474 |
| 5,898,154 A | 4/1999 | Rosen | |
| 5,933,625 A | 8/1999 | Sugiyama | |
| 6,122,625 A | 9/2000 | Rosen | |
| 6,253,027 B1 | 6/2001 | Weber et al. | |
| 6,377,543 B1 * | 4/2002 | Grover et al. | 370/227 |
| 6,411,598 B1 * | 6/2002 | McGlade | 370/217 |
| 6,456,595 B1 * | 9/2002 | Bartholomay et al. | 370/242 |
| 6,487,173 B2 * | 11/2002 | Tatsumi | 370/242 |

* cited by examiner

*Primary Examiner*—John Pezzlo
*Assistant Examiner*—Donald L Mills

(57) ABSTRACT

A link extender node is used to extend links between end nodes and/or routing nodes in a system area network. A connection includes a first link, coupling an end or routing node to a local port of a first link extender, a second link coupling the remote ports of first and second link extenders, and a third link coupling the local port of the second link extender to an end or routing node. The link extender includes link exception detection logic and transmits a this link bad command on the link generating the exception and transmits an other link bad command on the link not generating the exception.

11 Claims, 6 Drawing Sheets

Fault Tolerant ServerNet II System Area Network

FC-AL Pair of controllers each with two links into one fabric

Single Ported NICs

Typical End Nodes:
- CPU
- I/O Controller
- PC Workstation

Dual Ported NICs

FIG. 4
PRIOR ART

Link Exceptions

| Type | Condition |
|---|---|
| Receive FIFO overflow | The receive FIFO was full when new packet data was received. The new data has been discarded. |
| Packet CRC exception | A packet framed by a TPG command failed the CRC check. |
| Packet length exception (Run-on packet) | The receive link layer protocol logic has processed a packet with a data length greater than 1796 data bytes. |
| Packet framing exception | A packet teminated by an IDLE command was received |
| Link alive exception | The link alive status has changed state from link alive to link dead |
| Command exception | An illegal or unsupported command is received<br>A TLB or OLB command is received |

FIG. 5
PRIOR ART

ServerNet Connection

OLB Command Usage

FIG. 8

Connection Fault Isolation

| Node A reports | Node B reports | Fault location |
|---|---|---|
| TLB or other exception | OLB | Link 1 |
| OLB | TLB or other exception | Link 3 |
| OLB | OLB | Link 2 |

FIG. 10

Exception Reporting Sequence

| Step Number | Node A | Link Extender X Local Port | Link Extender X Remote Port | Link Extender Y Remote Port | Link Extender Y Local Port | Node B |
|---|---|---|---|---|---|---|
| 1 |  | latch Error |  |  |  |  |
| 2 |  | TLB | OLB |  |  |  |
| 3 | latch TLB |  |  | latch OLB |  |  |
| 4 | TLB |  |  | TLB | OLB |  |
| 5 |  | Discarded TLB | latch TLB |  |  | latch OLB |
| 6 |  | OLB | TLB |  |  | TLB |
| 7 | Discarded OLB |  |  | Discarded TLB | latch TLB |  |
| 8 |  |  |  | OLB | TLB |  |
| 9 |  |  | Discarded OLB |  |  | Discarded TLB |
| 10 |  |  |  |  |  |  |
| 11 |  | HW clears latch | HW clears latch | HW clears latch | HW clears latch |  |
| 12 | SW reads TLB |  |  |  |  | SW reads OLB |

LINK EXTENDERS WITH ERROR PROPAGATION AND REPORTING

BACKGROUND OF THE INVENTION

A SAN is used to interconnect nodes within a distributed computer system, such as a cluster. The SAN is a type of network that provides high bandwidth, low latency communication with a very low error rate. SANs often utilize fault-tolerant technology to assure high availability. The performance of a SAN resembles a memory subsystem more than a traditional local area network (LAN).

Figure 1:
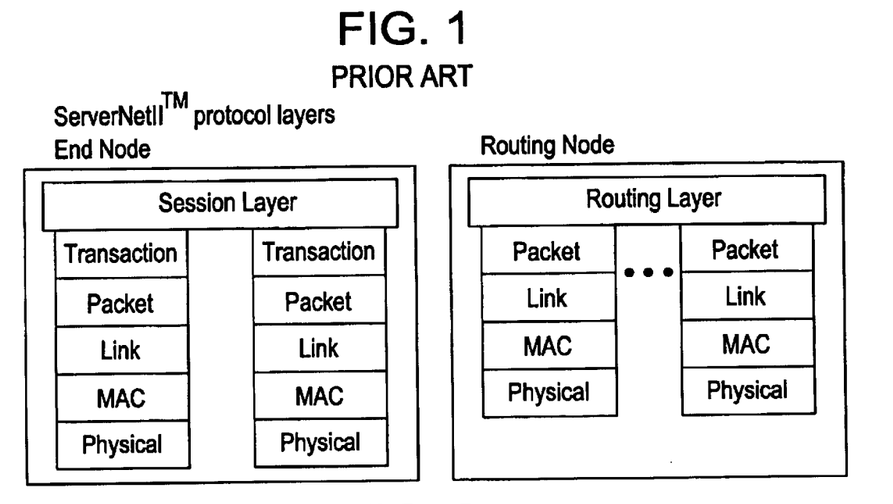
FIG. 1 is a block diagram depicting the protocol levels of an end node and routing node.

The preferred embodiments will be described as implemented in the ServerNet™ (ServerNet) architecture, manufactured by the assignee of the present invention, which is a layered transport protocol for a System Area Network (SAN). The ServerNet II™ protocol layers for an end node and for a routing node are illustrated in FIG. 1. A single NIC and session layer may support one or two ports, each with its associated transaction, packet, link-level, MAC (media access) and physical layer. Similarly, routing nodes with a common routing layer may support multiple ports, each with its associated link-level, MAC and physical layer. The link layer protocol provides link management functions, encoding and decoding of data and command, and buffering of received packet data. The ServerNet II™ link layer protocol is a set of simple protocols, running concurrently to manage the flow of status and packet data between ports on independent nodes. Each port contains a transmitter (TxPort) and a receiver (RxPort) which cooperate to manage the link.

Figure 2:
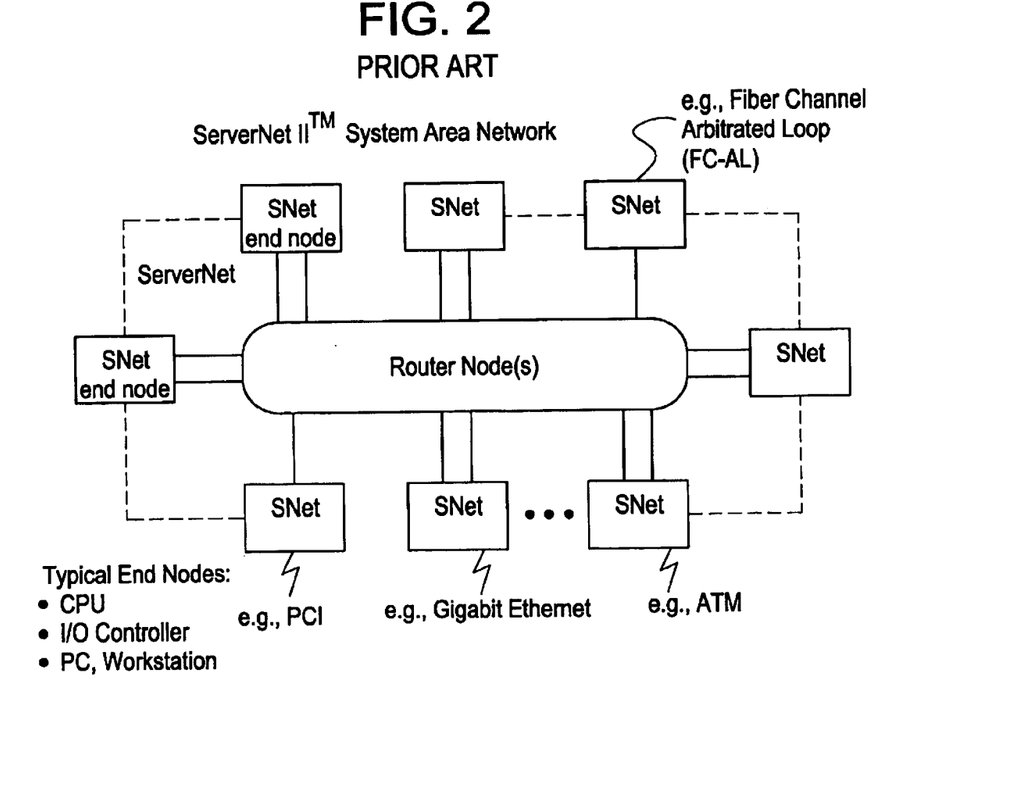
FIGS. 2 and 3 are block diagrams of SANs.
Figure 3:
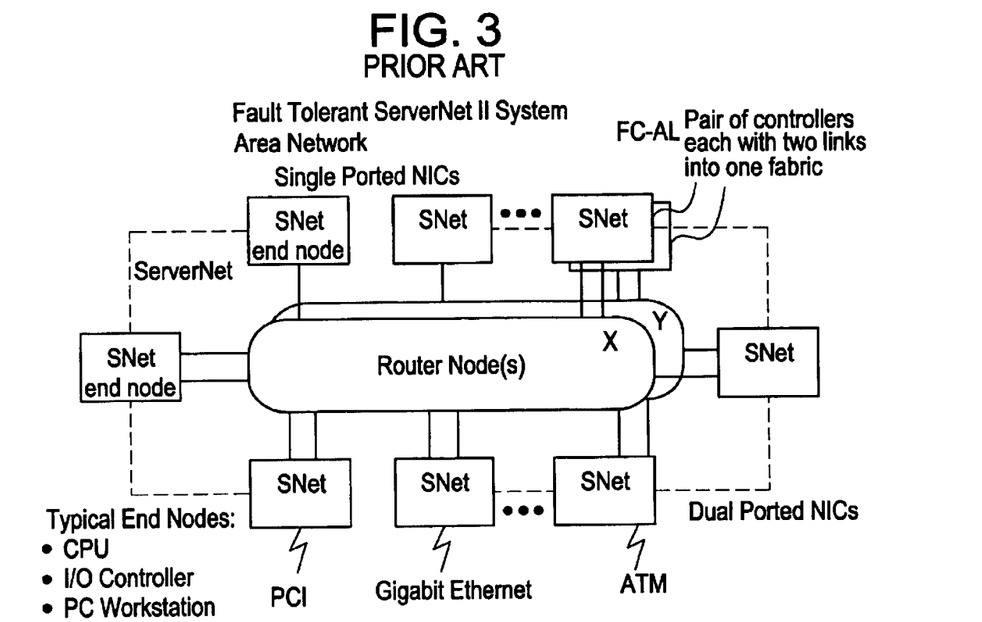

Support for two ports enables a ServerNet™ SAN to be configured in both non-redundant and redundant (fault tolerant, or FT) SAN configurations as illustrated in FIG. 2 and FIG. 3. On a fault tolerant network, a port of each end node may be connected to each network to provide continued message communication in the event of failure of one of the SANs. In the fault tolerant SAN, nodes may be also ported into a single fabric or single ported end nodes may be grouped into pairs to provide duplex FT controllers. The fabric is the collection of routers, switches, connectors, and cables that connects the nodes in a network.

The SAN includes end nodes and routing nodes connected by physical links. End nodes generate and consume data packets. Routing nodes never generate or consume data packets but simply pass the packets along from the source end node to the destination end node.

Each node includes one more full duplex ports each connected to a physical link. A link layer protocol (LLP) manages the flow of status and packet data between ports on independent nodes.

The ServerNet™ SAN has the ability to perform system management from a single point anywhere in the SAN. SAN management performs many functions including collection of error information to isolate faults to the link or module where the faults occurred.

An "In Band Control" or IBC mechanism supports a low overhead way of performing SAN management functions. The term "in band" indicates that the network management control data travels over the existing SAN links—with no separate cable or LAN connection. In contrast to data packets, both routing nodes and end nodes generate and consume IBC packets. IBC packets are not routed like data packets, each IBC packet contains embedded source routing information. Each router or end node that receives the IBC packet forwards it to the next destination in source route list.

The ServerNet™ SAN includes a maintenance system having responsibility for system initialization, fault reporting, diagnostics, and environmental control. A pair of service processors (SPs) manage the maintenance system. The SPs function as ServerNet™ I/O controllers and communicate with each other only via the ServerNet™ SAN.

The maintenance system uses dual system-maintenance buses which form redundant trees, independent of normal system functional paths and provide a path of two industry standard interconnects. The maintenance system controls, initializes, tests, and monitors all ASIC operations and provides a means for ASIC initialization, SAN topology determination, and error reporting.

One function of the link layer protocol is to maintain a "this link bad" (TLB) protocol. TLB (this link bad) commands are used to communicate exception status between the nodes comprising a link. Status flags and other state information are used to communicate exception status to software either directly (far end nodes) or via the maintenance system (for routing nodes). A port transmits a TLB command when the link is alive and one of the exceptions listed in the table of FIG. 4 occurs. Exceptions listed in FIG. 4 include: receive FIFO overflow; packet CRC exception; packet length exception (run-on packet); packet framing exception; link alive exception; and command exception.

Figure 4:
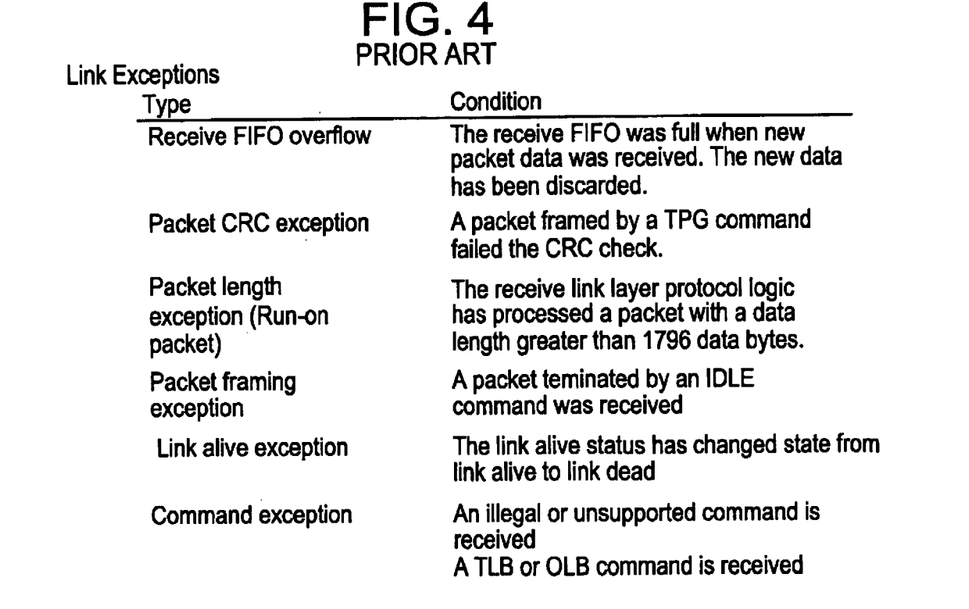
FIG. 4 is a table listing the exceptions that cause transmission of a "this link bad" (TLB) command symbol.

The receive FIFO overflow type of exception indicates that the receive FIFO was full when new packet data was received and that the new data has been discarded. The packet CRC type of exception indicates that a packet framed by a TPG command failed the CRC check. The packet length type of exception indicates that the receive link layer protocol logic has processed a packet with a data link greater than 1,796 data bytes. The packet framing type of exception indicates that a packet terminated by an IDLE command was received. The link alive type of exception indicates that the link alive status has changed state, e.g., from the status of link alive to link dead. The command type of exception indicates an illegal or unsupported command is received or that a TLB or OLB command is received. Note that one of the conditions that results in transmission of a TLB command is the receipt of a TLB command. Thus all link errors result in the transmission of TLB commands in both directions on a link.

The ServerNet™ SAN has been enhanced to improve performance. The original ServerNet™ SAN configuration is designated SNet I and the improved configuration is designated SNet II. Among the improvements implemented in the SNet II SAN is a higher transfer rate and different symbol encoding. To attach SNet I end nodes and routing nodes to serial cables, a special two-port router ASIC matches SNet I devices to SNet II devices. This two-port router will be referred to as a "link-extender", as used herein, is only a convenient name and does not connote any limitations on the functioning of the device.

Figure 5:
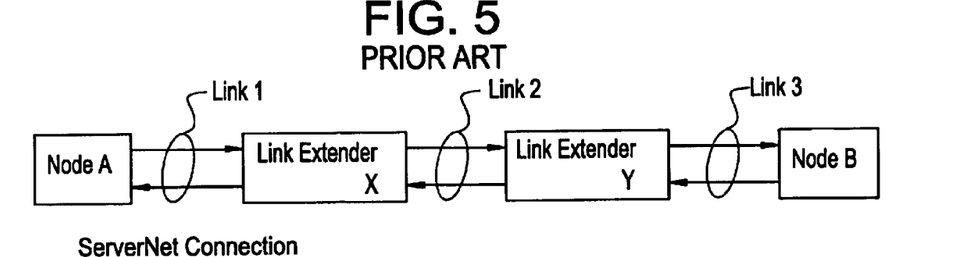
FIG. 5 depicts end nodes and link extension chips coupled in a connection.

A typical connection utilizing link-extenders is depicted in FIG. 5. Node A is connected to first link extender x by link 1. The first link extender x is coupled: by link 2 to a second link extender y. The second link extender y is coupled by link 3 to the Node B. The link extenders normally operate without intervention of system error handling software. Accordingly, the system error handling software sees the connection as a single link and is not able to isolate faults to a particular physical link, e.g., link 1, 2, or 3 in FIG. 5.

SUMMARY OF THE INVENTION

According to one aspect of the invention, a link extender includes error propagation logic that detects an exception on a link connected to the link extender and transmits an Other Link Bad (OLB) command on the other link connected to the link extender.

According to another aspect of the invention, a fault occurring in a first, second or third link included in a connection between two nodes (A and B) is isolated utilizing a this link bad (TLB); other link bad (OLB) protocol. When the first link is bad, a TLB is received by node A and an OLB by node B. When the second link is bad, both nodes receive OLBs. When the third link is bad, node A receives an OLB and node B receives a TLB.

According to another aspect of the invention, the TLB and OLB exceptions are reported by the nodes so that the SAN manager can isolate the faults.

Other features and advantages of the invention will be apparent in view of the following detailed description and appended drawings.

DESCRIPTION OF THE SPECIFIC EMBODIMENTS

Figure 6:
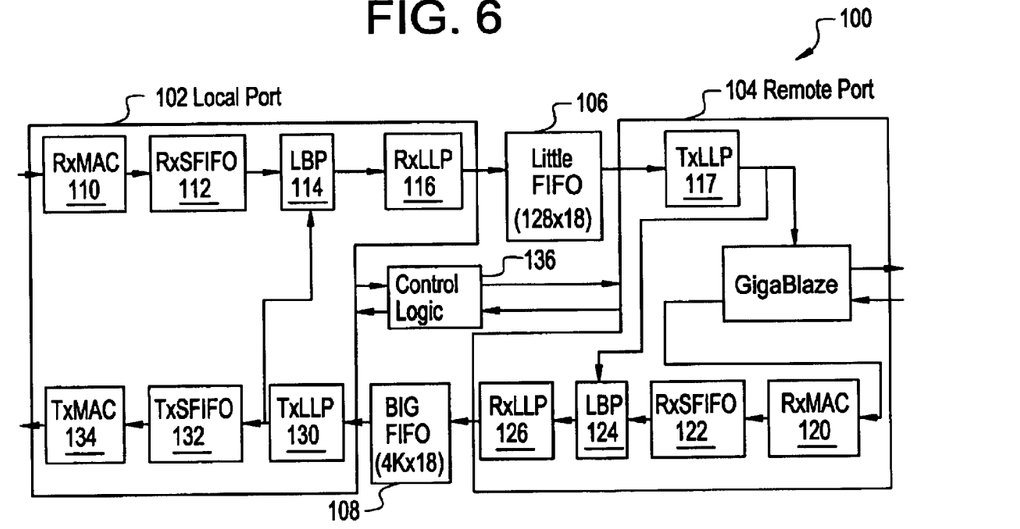
FIG. 6 is a block diagram of a link extension chip.

FIG. 6 is a block diagram of a link extension chip 100 which includes a local port 102 and a remote port 104 each including a transmit/receive pair. Big and little FIFOs 108 and 106 couple the local and remote ports. The local port is associated with a short link that pushes data into the little FIFO 106, and the remote port 104 is associated with the longer link, e.g., a long cable or fiber optic link, and pushes data into the big FIFO 108. Control logic 136 is operatively connected to each of the local port 102 and the remote port 104.

The receive side of the local port 102 includes a receive media access layer (RxMAC) 110, a receive synchronization module (RxSFIFO) 112, a loop back prevention module (LBP) 114, and a receive link layer protocol module (RxLLP) 116. The transmit side of the local port 102 includes the transmit link level protocol module (TxLLP) 117 and is coupled to the receive side of the local port 102 by the little FIFO 106.

The receive side of the remote port 104 includes a receive media access layer (RxMAC) 120, a receive synchronization module (RxSFIFO) 122, a loop back prevention module (LBP) 124, and a receive link layer protocol module (RXLLP) 126. The transmit side of the remote port 104 includes a transmit link layer protocol module (TxLLP) 130, a transmit synchronization module (TxSFIFO) 132, and a transmit media access layer module (TxMAC) 134. The transmit side of the local port 102 is coupled to the receive side of the remote port 104 by the big FIFO 108. A big FIFO 108 is required because of the large latency of long serial links.

In a currently preferred embodiment, a GigaBlaze™ control register contains the necessary control and status to operate the LSI Logic GigaBlaze™ G10™ module which implements parallel/serial conversion.

As described above, one function of the link level protocol (LLP) is to detect the exceptions listed in FIG. 4 and communicate exception status between the nodes comprising a link utilizing the "this link bad" (TLB) command. A port must transmit a TLB command when all of the following conditions are true:

1. Its link is alive.
2. Its receiver detects one of the exceptions listed in FIG. 4.
3. There is not an existing exception in the exception register; i.e. there are no exceptions waiting to be cleared.

One of the events that triggers an exception is the receipt of a TLB command. Thus, as depicted in FIG. 4, all link errors result in the transmission of TLB commands in both directions.

In a preferred embodiment of the invention, "other link bad" (OLB) commands are used by link extender nodes to report link exceptions detected on one of their ports to the node at the opposite end of the link extender's other link.

A port of a link extender must transmit an OLB command when all of the following conditions are true:

1. Its link is alive.
2. The receiver at the other port detects any of the exceptions listed in FIG. 4;
3. There is not an existing exception in the exception register; i.e. there are no exceptions waiting to be cleared.

Figure 7:
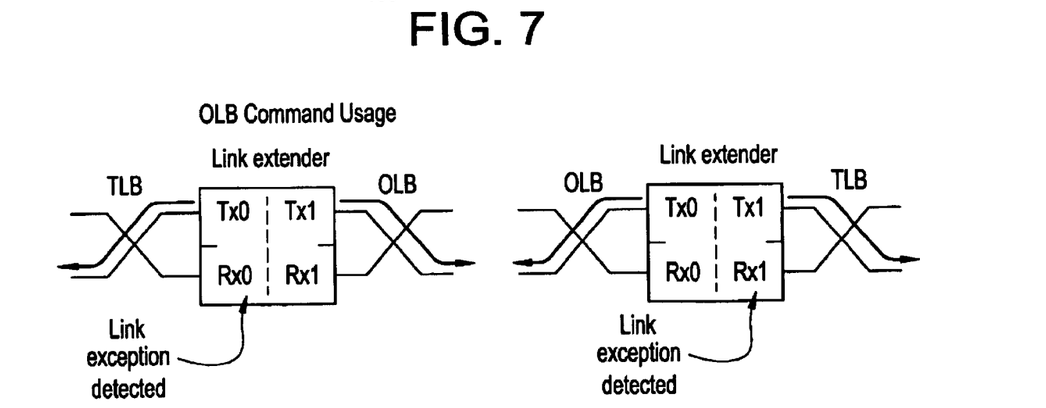
FIG. 7 is a schematic diagram of the operation of the other link bad (OLB) command.

The use of the OLB command is illustrated by FIG. 7. When the control logic 136 of a link extender detects an exception on a link, it transmits a TLB command back to the node on the opposite of the link and instructs the transmitter in its other port to transmit an OLB command.

Since receipt of an OLB or a TLB command is one of the link exception conditions, the OLB command is propagated in both directions until it arrives at an end or routing node. Since the end and routing nodes capture the first exception, software can identify a faulty link by examining exceptions captured in the end and/or routing nodes at each end of a connection.

The receive logic in each port of the link extender node monitors the receive link for protocol violations. When any exception is detected:

1. The exception is captured in the link exception data register.
2. The port transmitter sends a TLB to the far end of its link.
3. The other port's transmitter sends an OLB on its link.
4. A timer is started that will clear the link exception to allow new exceptions to be reported.

Steps 3 and 4 assure the link exception is reported to both ends of the connection and re-enables link exception reporting. The forwarded OLB allows fault isolation logic to identify which link in the connection detected the exception. Such fault isolation logic (according to an aspect of the invention) is depicted via the block diagram of a network 1100 in example FIG. 11.

Figure 11:
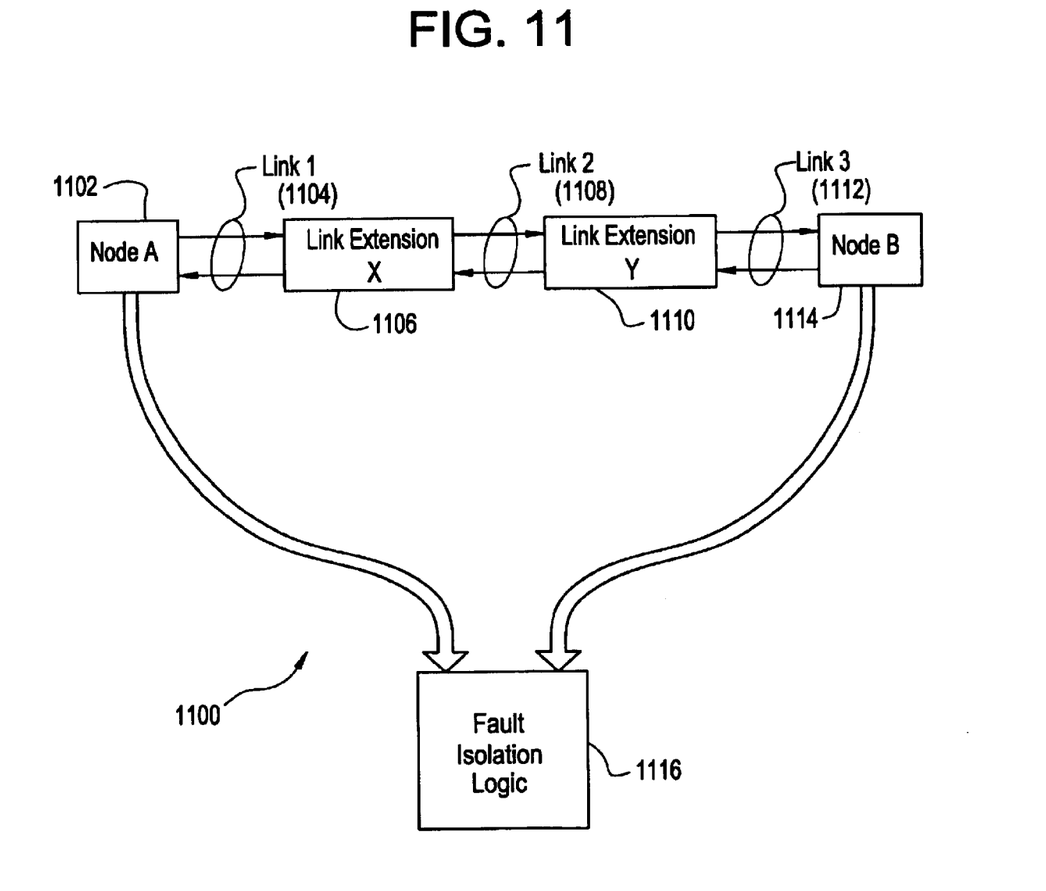
FIG. 11 is a block diagram of end nodes, link-extension devices and fault-isolation logic coupled in a connection.

Network 1100 includes: a node A (1102); a link-extension device X (1106); a first link coupling node A (1102) and link-extension device X (1106); a link-extension device Y (1110); a second link 1108 coupling link-extension device X (1106) and link-extension device Y (1110); a node B (1114); a third link (1112) coupling second link-extension device Y (1110) node B (1114); and fault-isolation logic 1116.

Figure 8:
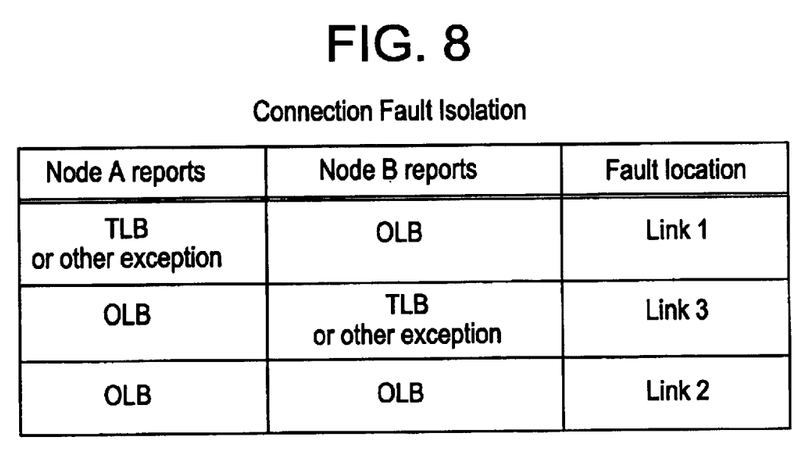
FIG. 8 is a table showing fault locations in a connection.

The faults are isolated using the exception reported by the nodes at the end of the locations. Operation of fault-isolation logic 1116 is described in terms of using relationships represented FIG. 8. FIG. 8 is a table showing the fault locations (for connection depicted in FIG. 11).

The table in FIG. 8 can be thought of as a look-up table. By indexing into the table using the command or exception reported by node A and node B, respectively, the faulty link can be identified. For example, where node A reports one of the exceptions listed in FIG. 4 and node B reports receipt of an OLB command, then the table of FIG. 8 returns link 1 as the faulty link.

Figure 9:
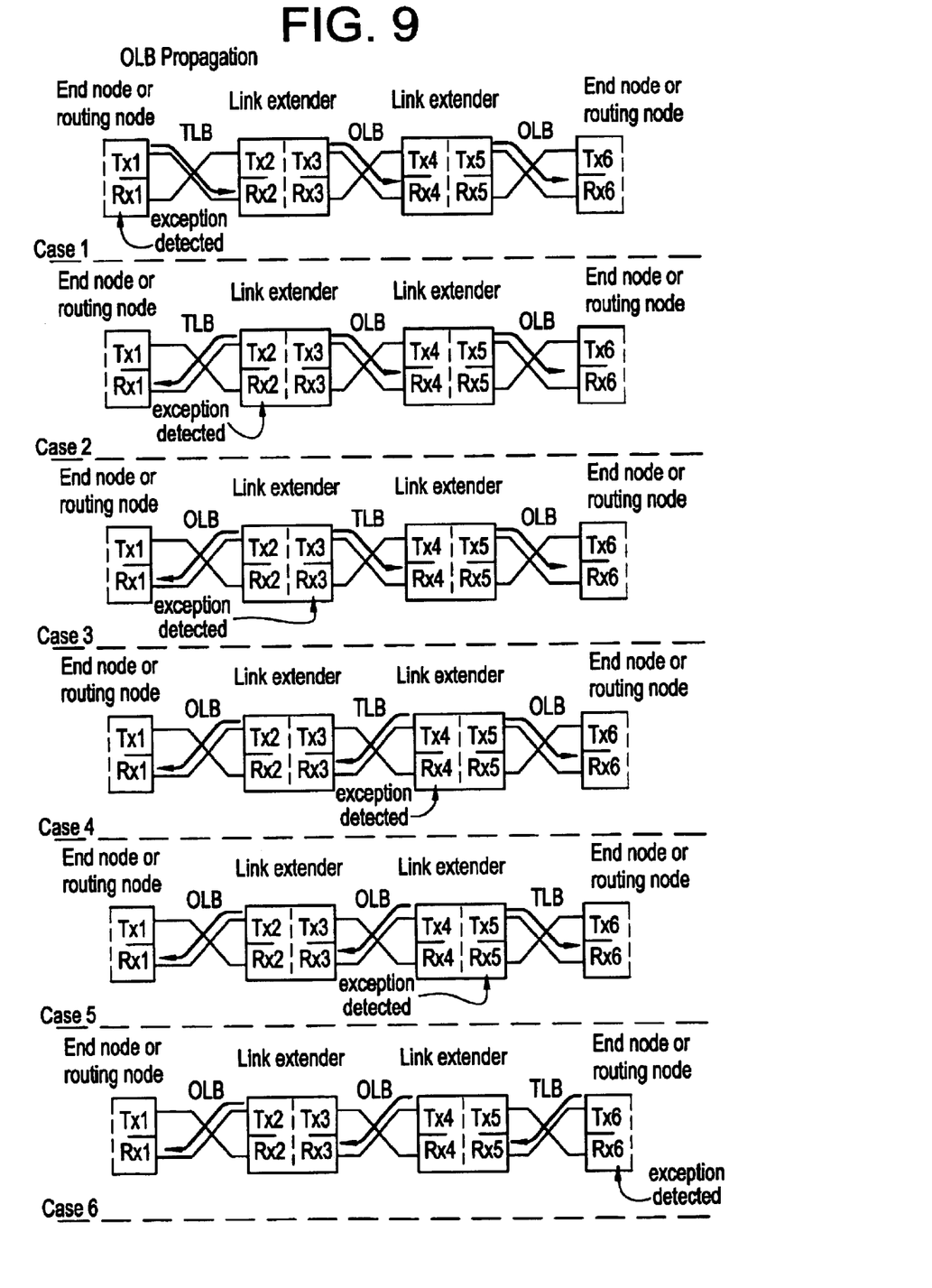
FIG. 9 is a schematic diagram depicting OLB propagation for six cases of exception detection.

FIG. 9 depicts OLB propagation for six cases of exception detection. In cases 1 and 2, the fault is located in link 1; in cases 3 and 4, the fault is located in link 2; and in cases 5 and 6, the fault is located in link 3.

In FIG. 9, for case 1, an exception is detected by the receiver Rx1 in the left hand end/routing node. In case 2, an exception is detected in the receiver Rx2 in the local port of the left-most link extender. In case 3, an exception is detected by the receiver Rx3 in the remote port of the left-most link extender. In case 4, the receiver Rx4 in the local side of the right-most link extender detects an exception. In case 5, the receiver Rx5 in the remote port side of the right-most link extender detects the exception. In case 6, the receiver Rx6 in the right hand end/routing node detects an exception.

In each of cases 1, 3, 4, and 6 depicted in FIG. 9, a link extender receives a TLB command at a first port. The corresponding control logic 136 of the link extender is operable to: convert TLB command received by the receiver of the first port into an OLB command; cause the OLB command to be passed to the transmitter of the second port; and cause the transmitter of the second port to transmit the OLB command out of the link extender.

Figure 10:
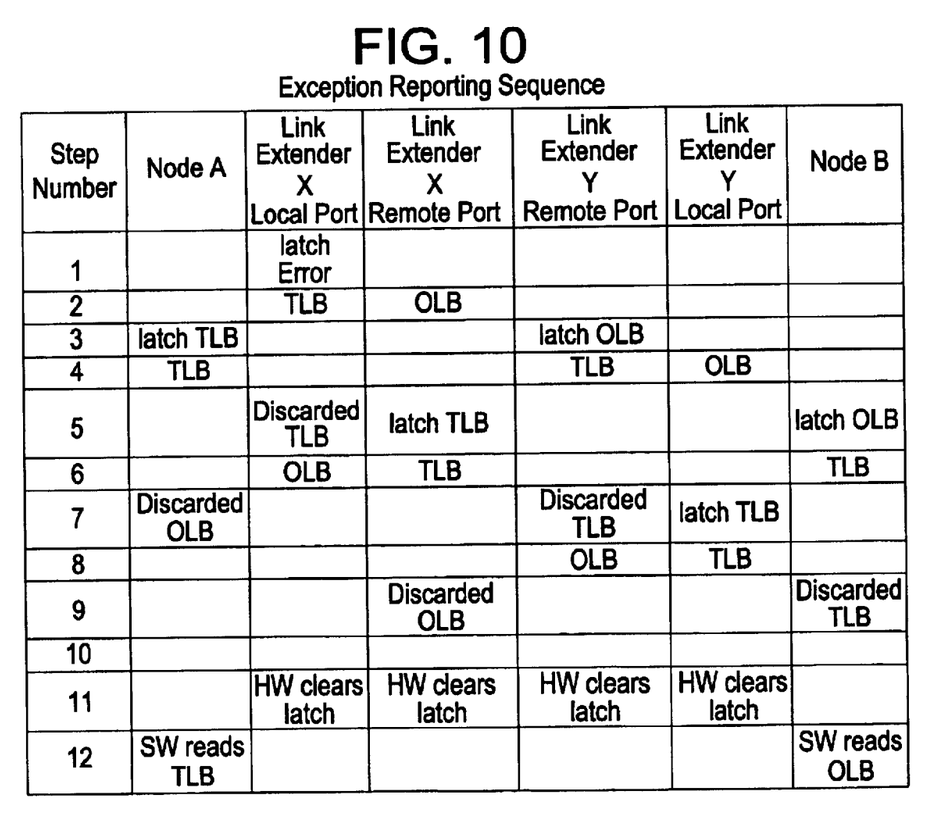
FIG. 10 is a table depicting the exception reporting steps carried out by the nodes in a connection.

FIG. 10 is a table depicting the exception reporting steps carried out by the nodes in the connection of FIG. 2 when an exception is detected by the local port of link extender X.

The invention has now been described with reference to the preferred embodiments. Alternatives and substitutions will now be apparent to persons of skill in the art. In particular, the exceptions described above are by way example and not critical to practicing the invention. Accordingly, it is not intended to limit the invention except as provided by the appended claims.

What is claimed is:

1. A node device in a system area network (SAN) comprising:
    a first port, coupled to a first node, with the first port including a receiver for receiving data from the first node and a transmitter for transmitting data to the first node;
    a second port, coupled to a second node, with the second port including a receiver for receiving data from the second node and a transmitter for transmitting data to the second node; and
    control logic coupled to both the first and second ports, and operable for
        detecting an exception at the receiver of either of the first and second ports and for generating a this link bad (TLB) command to be transmitted by one of the first and second ports that detected the exception and an other link bad (OLB) command to be transmitted from the other of the first and second ports that did not detect the exception,
        passing an OLB command received by the receiver at the first port to the second port for transmission by the transmitter at the second port;
        converting a TLB command received by the receiver at the first port to an OLB command and passing the OLB command to the second port for transmission by the transmitter at the second port.

2. In a system area network including end-nodes and routing nodes connected by physical links and link extenders for coupling links from either end-nodes or routing nodes to serial cables, where the link extenders are coupled in a connection comprising a first node having a port, a first link extender having local and remote ports, a first link coupling the port of said first node and the local port of said first link extender, a second link extender having local and remote ports, a second link coupling the remote ports of said first and second link extenders, a second node having a port, and a third link coupling the local port of said second link extender to the port of said second node, with the links being duplex links and each port having a receiver and transmitter, a method for determining, at said first and second nodes the identity of a faulty link in the connection, said method comprising the steps of:
    detecting a link exception indication, at the receiver of one of said ports, identifying a faulty link;
    if said first link is the faulty link;
        transmitting a TLB (this link bad) command from the transmitter of the local port of said first link extender;
        transmitting an OLB (other link bad) command from the transmitter of the remote port of said first link extender;
        receiving the OLB command at the receiver of the remote port of said second link extender;
        transmitting an OLB command from the transmitter of the local port of the second link extender so that the first node receives a TLB command and the second node receives an OLB command to indicate that the first link is faulty;
    if said second link is the faulty link;
        transmitting TLB commands from the transmitters of the remote ports of said first and second link extenders;
        transmitting OLB commands from the transmitters of the local ports of said first and second link extenders so that the first and second nodes both receive OLB commands indicating that the second link is faulty;
    if said third link is the faulty link;
        transmitting a TLB command from the transmitter of the local port of said second link extender;
        transmitting an OLB command from the transmitter of the remote port of said second link extender;
        receiving said OLB command at the receiver of the remote port of said first link extender; and
        transmitting an OLB command from the transmitter of the local port of said first link extender so that the first node receives an OLB command and the second node receives a TLB command indicating that the third link is faulty.

3. The node device of claim 1, wherein the node device is one of a repeater and a two-port router.

4. An interface arrangement in a system area network, the arrangement comprising:
    a first interface-node having
        a first network-port coupled to a first network end-node, the first end-node being operable according to a first protocol, and
        a first extension-port;

a second interface-node having
   a second network-port coupled to a second network end-node, the second end-node being operable according to a second protocol different than the first protocol, and
   a second extension-port; and
a link coupling the first extension-port of the first interface-node and the second interface-port of the second interface-node;
each of the interface nodes including control logic operable to
   detect an exception at one of the network-port and the extension-port,
   responsively generate a this link bad (TLB) command to be transmitted through the one of the network-port and the extension port that detected the exception, and
   responsively generate an other link bad (OLB) command to be transmitted from the other of the network-port and the extension port that did not detect the exception.

5. The interface arrangement of claim 4, wherein the control logic of each of the first and second interface-nodes is further operable to:
   detect an OLB command received by one of the network-port and the extension-port; and
   pass the OLB command to the other of the network-port and the extension port that did not receive the OLB command for transmission thereof.

6. The interface arrangement of claim 4, wherein the control logic of each of the first and second interface-nodes is further operable to:
   detect a TLB command received by one of the network-port and the extension-port;
   convert the received TLB command into an OLB command; and
   pass the OLB command to the other of the network-port and the extension port that did not receive the TLB command for transmission thereof.

7. The interface arrangement of claim 4, wherein at least one of the interface-nodes is one of a repeater and a two-port router.

8. A system area network comprising:
a first node;
a first link-extension device;
a first link coupling the first node and the first link-extension device;
a second link-extension device;
a second link coupling the first link-extension device and the second link-extension device;
a second node;
a third link coupling the second link-extension device and the second node; and
fault-isolation logic, at least indirectly communicating with one or more of the first and second nodes, operable to identify which of the first, second or third links exhibited a fault.

9. The system area network of claim 8, wherein the fault-isolation logic is operable to
   determine, for each of the first and second node, which of a link exception, this_link_bad (TLB) command or an other_link_bad (OLB) command has been reported; and
   identify the first, second or third link as exhibiting a coupling-fault based upon commands reported by the first node and the second node, respectively.

10. The method of claim 9, wherein the fault-isolation logic is operable to use relationships represented via the following look-up table

| First Node: command reported | Second Node: command reported | Faulty Link |
|---|---|---|
| TLB or link exception | OLB | First Link |
| OLB | TLB or link exception | Second Link |
| OLB | OLB | Third Link | to identify which of the first, second and third links exhibits the coupling-fault.

11. The system area network of claim 8, wherein:
the first and second nodes are network end-nodes; and
the first and second end-nodes are operable according to different protocols.

* * * * *

UNITED STATES PATENT AND TRADEMARK OFFICE
CERTIFICATE OF CORRECTION

PATENT NO. : 6,870,814 B1
APPLICATION NO. : 09/415731
DATED : March 22, 2005
INVENTOR(S) : William P. Bunton et al.

It is certified that error appears in the above-identified patent and that said Letters Patent is hereby corrected as shown below:

IN THE CLAIMS

Claim 4, Column 7, line 8, delete "interface-port" and insert therefor --extension-port--

Claim 8, Column 8, line 13, after "fault" insert
--the first and second nodes are network end-nodes;
the first end-node being operable according to a first protocol; and
the second end-node being operable to a second protocol different than the first protocol--

Claim 11, Column 8, line 38, delete "The system area network of claim 8, wherein:
the first and second nodes are network end-nodes; and
the first and second end-nodes are operable according to different
protocols," and insert therefor
--A system area network comprising:
a first node;
a first link-extension device;
a first link coupling the first node and the first link-extension device;
a second link-extension device;
a second link connecting the first link-extension device and the second link-extension device;

UNITED STATES PATENT AND TRADEMARK OFFICE
CERTIFICATE OF CORRECTION

PATENT NO. : 6,870,814 B1
APPLICATION NO. : 09/415731
DATED : March 22, 2005
INVENTOR(S) : William P. Bunton et al.

It is certified that error appears in the above-identified patent and that said Letters Patent is hereby corrected as shown below:

Claim 11, Column 8, line 38, (cont.d)
a second node;
a third link coupling the second link-extension device and the second node; and
fault-isolation logic, at least indirectly communicating with one or more of the first and second nodes, operable to identify which of the first, second or third links exhibited a fault.--

Signed and Sealed this

First Day of April, 2008

JON W. DUDAS
*Director of the United States Patent and Trademark Office*